United States Patent
Rose

(10) Patent No.: US 12,282,751 B2
(45) Date of Patent: *Apr. 22, 2025

(54) PERFORMING CONSTANT MODULO ARITHMETIC

(71) Applicant: Imagination Technologies Limited, Kings Langley (GB)

(72) Inventor: Thomas Rose, Watford (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/868,266

(22) Filed: Jul. 19, 2022

(65) Prior Publication Data

US 2022/0365755 A1    Nov. 17, 2022

Related U.S. Application Data

(63) Continuation of application No. 17/105,210, filed on Nov. 25, 2020, now Pat. No. 11,409,500, which is a continuation of application No. 15/930,818, filed on May 13, 2020, now Pat. No. 10,877,732, which is a continuation of application No. 16/459,886, filed on Jul. 2, 2019, now Pat. No. 10,691,416, which is a continuation of application No. 15/149,312, filed on May 9, 2016, now Pat. No. 10,372,420.

(30) Foreign Application Priority Data

May 8, 2015    (GB) ...................................... 1507893

(51) Int. Cl.
*G06F 7/72*    (2006.01)

(52) U.S. Cl.
CPC ..................................... *G06F 7/72* (2013.01)

(58) Field of Classification Search
CPC ............. G06F 7/72; G06F 7/727; G06F 7/729
USPC .......................................................... 708/491
See application file for complete search history.

(56) References Cited

U.S. PATENT DOCUMENTS

| 4,538,238 A | 8/1985 | Circello et al. |
| 6,127,948 A | 10/2000 | Hillis et al. |
| 7,849,125 B2 | 12/2010 | Shen |

(Continued)

OTHER PUBLICATIONS

G. Even, Computer Structure & Intro. to Digital Computers, Ch 6: Addition, lecture notes Tel-Aviv Univ, 2003 (Year: 2003).*

(Continued)

*Primary Examiner* — Emily E Larocque
(74) *Attorney, Agent, or Firm* — Potomac Law Group, PLLC; Vincent M DeLuca

(57) ABSTRACT

A binary logic circuit for determining $y = x \bmod(2^m - 1)$, where x is an n-bit integer, y is an m-bit integer, and $n > m$, includes reduction logic configured to reduce x to a sum of a first m-bit integer $\beta$ and a second m-bit integer $\gamma$; and addition logic configured to calculate an addition output represented by the m least significant bits of the following sum right-shifted by m: a first binary value of length 2m, the m most significant bits and the m least significant bits each being the string of bit values represented by $\beta$; a second binary value of length 2m, the m most significant bits and the m least significant bits each being the string of bit values represented by $\gamma$; and the binary value 1.

18 Claims, 7 Drawing Sheets

(56) References Cited

U.S. PATENT DOCUMENTS 10,877,732 B2   12/2020  Rose
2009/0157784 A1  6/2009  Gopal et al.

OTHER PUBLICATIONS

Chang et al., "A Configurable Dual Moduli Multi-Operand Modulo Adder," IEEE ISCAS Jun. 2005, vol. 2, No. 10, pp. 1630-1633.

* cited by examiner

PERFORMING CONSTANT MODULO ARITHMETIC

CROSS-REFERENCE TO RELATED APPLICATIONS AND CLAIM OF PRIORITY

This application is a continuation under 35 U.S.C. 120 of copending application Ser. No. 17/105,210 filed Nov. 25, 2020, which is continuation of prior application Ser. No. 15/930,818 filed May 13, 2020, now U.S. Pat. No. 10,877,732, which is a continuation of prior application Ser. No. 16/459,886 filed Jul. 2, 2019, now U.S. Pat. No. 10,691,416, which is a continuation of prior application Ser. No. 15/149,312 filed May 9, 2016, now U.S. Pat. No. 10,372,420, which claims foreign priority under 35 U.S.C. 119 from United Kingdom Application No. 1507893.4 filed May 8, 2015.

BACKGROUND OF THE INVENTION

This invention relates to a binary logic circuit for determining $y=x \mod(2^m-1)$, where $m>1$, x is an n bit unsigned integer and $n>m$. In computing, the modulo operation (abbreviated as mod) finds the remainder of the Euclidean division of a number, called the dividend, by a divisor, called the modulus. Thus, in the expression $y=x \mod(2^m-1)$, x is the dividend, $2^m-1$ is the modulus, and y is the remainder.

It is a common requirement in digital circuits that hardware is provided for calculating the value of $x \mod(2^m-1)$ for some input x, where m is some constant known at design time. Often m will be the size of the number space so $2^m-1$ represents the largest number in that number space. For example, in a 16 bit unsigned number space, the smallest possible number is typically 0 and the largest possible number is $65535=2^{16}-1$. Calculations of $x \mod(2^m-1)$ are therefore frequently performed in digital logic and it is important to be able to perform them as quickly as possible so as to not introduce delay into the critical path of the circuit.

Binary logic circuits for calculating $x \mod(2^m-1)$ are well known. For example, circuit design is often performed using tools which generate circuit designs at the register-transfer level (RTL) from libraries of logic units which would typically include a logic unit for calculating $x \mod(2^m-1)$. Such standard logic units will rarely represent the most efficient logic for calculating $x \mod(2^m-1)$ in terms of circuit area consumed or the amount of delay introduced into the critical path.

BRIEF SUMMARY OF THE INVENTION

According to a first aspect of the present invention there is provided a binary logic circuit for determining $y=x \mod(2^m-1)$, where x is an n-bit integer, y is an m-bit integer, and $n>m$, the binary logic circuit comprising:
  reduction logic configured to reduce x to a sum of a first m-bit integer and a second m-bit integer γ; and
  addition logic configured to calculate an addition output represented by the m least significant bits of the following sum right-shifted by m:
    a first binary value of length 2m, the m most significant bits and the m least significant bits each being the string of bit values represented by β,
    a second binary value of length 2m, the m most significant bits and the m least significant bits each being the string of bit values represented by γ, and the binary value 1.

The reduction logic may be configured to interpret x as a sum of m-bit rows x', each row representing m consecutive bits of x such that each bit of x contributes to only one row and all of the bits of x are allocated to a row, and the reduction logic is configured to reduce the sum of such m-bit rows x' in a series of reduction steps so as to generate the sum of the first m-bit integer and the second m-bit integer γ.

Each reduction step may comprise summing a plurality of the m-bit rows of x' so as to generate a sum of one or more fewer m-bit rows.

The reduction logic may be configured to, on a reduction step generating a carry bit for a row at binary position m+1, use the carry bit as the least significant bit of the row.

The reduction logic may comprise one or more reduction cells each configured to sum a plurality of the m-bit rows of x' so as to generate a sum of one or more fewer m-bit rows.

The reduction logic may comprise a plurality of reduction cells and the plurality of reduction cells being configured to operate in parallel on the rows of x' at each reduction step.

The reduction logic may comprise at least $$\lfloor \lceil \tfrac{n}{m} \rceil / 3 \rfloor$$

reduction cells each operating on a different set of three rows of x' such that, at each reduction step, the number of rows is reduced by approximately a third.

The reduction logic may comprise a plurality of reduction stages coupled together in series, each reduction stage comprising one or more reduction cells configured to operate in parallel so as to perform a reduction step.

The reduction logic may comprise a number of reduction stages equal to the number of reduction steps required to reduce the sum of m-bit rows x' to the sum of m-bit integers β and γ.

The reduction logic may be configured to iteratively operate the one or more reduction cells over the rows of x' until two rows remain which represent m-bit integers β and γ.

Each reduction cell may be configured to receive three rows of x' and comprise m full adders, each full adder being arranged to sum bits at a corresponding bit position in each of the three received rows so as to generate two rows: a first row comprising m sum bits and a second row comprising m carry bits.

The first row may represent sum bits at the first to $m^{th}$ bit positions and the second row represents carry bits at the second to $(m+1)^{th}$ binary positions, and the reduction logic is configured to wrap-around the carry bit at the $(m+1)^{th}$ position for use as the least significant bit of the second row.

The binary logic circuit may further comprise:
  exception logic configured to form a determination result indicating whether all of the bits of x are 1; and
  output logic configured to operate on the addition output in dependence on the determination result received from the exception logic;
  wherein the output logic is configured to, if the determination result indicates that all of the bits of x are 1, perform an XOR (exclusive OR) operation of the addition output with the binary value 1.

The exception logic may be configured to form a determination result of 1 if all of the bits of x are 1 and a determination result of 0 if not all of the bits of x are 1, and the output logic comprising a XOR gate configured to receive the addition output and determination result as its inputs so as to form as its output y for all inputs x.

The exception logic may comprise a hierarchy of AND gates, the output of the final AND gate being the determination result.

The addition logic may comprise a compound adder configured to concurrently form a first sum $\beta+\gamma$ and a second sum $\beta+\gamma+1$, and to provide the sums to a multiplexer configured to select between the first and second sums in dependence on whether the second sum generates a carry bit; the addition output of the multiplexer being the second sum if a carry bit is generated and the first sum if a carry bit is not generated.

The addition logic may comprise an adder configured to calculate the sum of the first and second binary values and 1, and the addition logic being configured to provide the m least significant bits of the sum right-shifted by m as the addition output.

According to a second aspect of the present invention there is provided a method for determining $y=x \bmod(2^m-1)$ in a binary logic circuit, where x is an n-bit integer, y is an m-bit integer, and n>m, the method comprising:

reducing x to a sum of a first m-bit integer $\beta$ and a second m-bit integer $\gamma$;

at least partially calculating a result for the sum of:
a first binary value of length 2m, the m most significant bits and the m least significant bits each being the string of bit values represented by $\beta$;
a second binary value of length 2m, the m most significant bits and the m least significant bits each being the string of bit values represented by $\gamma$; and
the binary value 1;

and
using the m least significant bits of the result right-shifted by m as y.

The method may further comprise representing x as a sum of m-bit rows x', each row being a selection of m consecutive bits from x such that each bit of x contributes to only one row and all of the bits of x are allocated to a row, wherein reducing x comprises reducing the sum of m-bit rows, x', to the sum of the first m-bit integer and the second m-bit integer $\gamma$.

Reducing x may comprise performing a plurality of reduction steps each comprising summing a plurality of the m-bit rows of x' so as to generate one or more fewer m-bit rows.

The method may further comprise, on generating a carry bit for a row at bit position m+1, using the carry bit as the least significant bit of the row.

Computer program code, such as a computer readable dataset description, defining the binary logic circuit may be provided, whereby the binary logic circuit can be manufactured by an integrated circuit manufacturing system. A non-transitory computer readable storage medium may be provided having stored thereon computer readable instructions that, when processed at a computer system for generating a manifestation of an integrated circuit, cause the computer system to generate a manifestation of the binary logic circuit.

BRIEF DESCRIPTION OF THE DRAWINGS

The present invention will now be described by way of example with reference to the accompanying drawings. In the drawings.

DETAILED DESCRIPTION OF THE INVENTION

The following description is presented by way of example to enable any person skilled in the art to make and use the invention. The present invention is not limited to the embodiments described herein and various modifications to the disclosed embodiments will be readily apparent to those skilled in the art.

There is a need for an improved binary logic circuit for calculating $y=x \bmod(2^m-1)$ where x is an input value of length n bits, y is the output of m bits, and m is known at design time.

Figure 1:
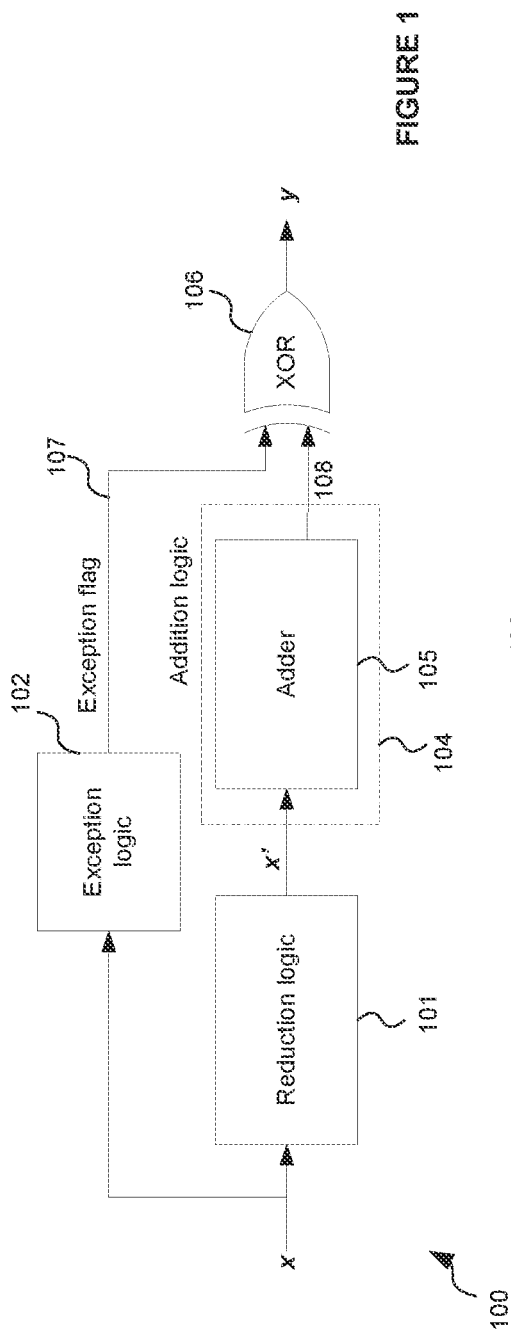
FIG. 1 is a schematic diagram of a binary logic circuit according to a first example.

In a first example, a binary logic circuit 100 for evaluating $y=x \bmod(2^m-1)$ for a given value of m and an input value x is shown in FIG. 1. The binary logic circuit comprises reduction logic 101 configured to reduce the range of input value x to a sum x' of two m-bit numbers, and addition logic 104 configured to calculate a sum determined from the sum x' of two m-bit numbers in such a way as to generate y. In the case that n mod(m)=0, exception logic 102 and a XOR 106 may be provided to ensure that the binary logic circuit provides the correct output in the case that all of the digits of x are 1. The operation of the components of the binary logic circuit in order to generate output y will now be described with reference to FIGS. 3 to 7.

Reduction logic 101 operates on binary input value x. Most generally, the reduction logic could comprise any kind of reduction cell(s) arranged in a manner suitable for reducing the range of x to a sum of two m-bit numbers and configured such that after each reduction step, bits carried above the m-th bit position are wrapped around into a position in the first bit position. This is acceptable because $2^m \bmod(2^m-1)=2^0$. In the examples described herein, one or more reduction cells are arranged to compress x expressed or interpreted as x', which is a sum of consecutive m-bit portions of x as indicated by 402 in FIG. 4. This particular expression or interpretation of x as a sum 402 of rows of length m can be used in place of x to calculate $y=x \bmod(2^m-1)$ because $x \bmod(2^m-1)=x' \bmod(2^m-1)$. This can be appreciated as follows:

$$x \bmod(2^m-1) = \left(\sum_{i=0}^{n-1} 2^i * x[i]\right) \bmod(2^m-1) =$$

-continued $$\left(\sum_{i=0}^{n-1}(2^i)\bmod(2^m-1)*x[i]\right)\bmod(2^m-1) = \left(\sum_{i=0}^{n-1}2^{i\bmod m}*x[i]\right)\bmod(2^m-1)$$

While the range of x is [0, $2^n-1$], the range of x' is [0, $k*(2^m-1)$] where k is the number of rows of x' and at 402 is less than or equal to $$\left\lceil \frac{n}{m} \right\rceil.$$

Consider a simple example of a 12 bit number x=110101101111. This number may be expressed in the form x' as a sum of consecutive m-bit portions of x as follows:

1111
+0110
+1101

The one or more reduction cells of reduction logic 101 may be one or more full adders arranged to reduce the rows of x' down to a sum of two rows of length m. A full adder receives two one-bit values and a carry bit as its inputs and outputs the sum of those bit values along with a carry bit. A full adder can therefore be used to sum the bits of a pair of rows of x' so as to compress those two rows of m bits into a single row of m bits and a carry bit. As is known in the art, this can be achieved by using a cascade of m full adders or by using fewer than m full adders and iteratively operating one or more of those full adders on the output of previous full adders.

Other types of reduction cells could alternatively be used, such as half adders. It will be appreciated that there are a large number of possible adder designs which can be used to reduce a sum of a plurality of m-bit binary numbers to a sum of two m-bit binary numbers. Any suitable adder design could be used in the reduction logic to reduce the range of x in accordance with the principles described herein.

The reduction logic 101 may comprise one or more reduction cells. In general, any kind of reduction cell able to reduce a binary sum of p rows down to a binary sum of q rows (a p to q reduction cell) may be used. The one or more reduction cells are configured so as to provide a pair of rows x' as the output of the reduction logic. Multiple reduction cells may be arranged in series or in parallel. In accordance with the teaching below, the reduction logic is configured to, following each reduction step, wrap-around carry bits at bit position m+1 to the first bit position.

The reduction logic 101 of the binary logic circuit operates until the rows of x' have been reduced to two rows, at which point x' lies in the range [0, $2*(2^m-1)$]. These two rows of length m of x' are referred to as β and γ.

An advantageous form of reduction cell 302 will now be described which provides high speed compression of x'. Each reduction cell comprises m full adders configured to operate on three rows of x' each of length m. Each full adder operates on a column of the corresponding bits of each row so as to compress the three rows into two rows of length m. The operation of the reduction cell is illustrated schematically in FIG. 10 which shows three rows 1001-1003 of length m (in this example m=5) that represent the input to the reduction cell. The reduction cell comprises five full adders 1004, each of which is configured to operate on a column of corresponding bits from the three rows. For example, full adder 1008 operates on the first bits of the rows which in this case involves summing the bits 1, 0 and 1. The output of the full adders comprises a carry bit and a sum bit, with the output of each full adder being indicated by the dashed arrows in the figure. For example, the output of full adder 1008 is represented by bit pair 1005 and comprises a carry bit 1 and a sum bit 0. Collectively, the carry bits represent a first output row 1006, and the sum bits represent a second output row 1007.

Prior to making use of the pair of output rows of a reduction cell, its carry bit 1009 which exists (logically at least) in the m+1 column/bit position is wrapped around to the first column/bit position. This is acceptable because $2^m \bmod(2^m-1)=2^0$ and ensures that the rows of x' remain aligned and of length m bits. The wrap-around of carry bits is described in more detail below with respect to FIG. 4. At a physical level, this wrap-around of the carry bit can be achieved through appropriate wiring of the output of the reduction logic.

Figure 10:
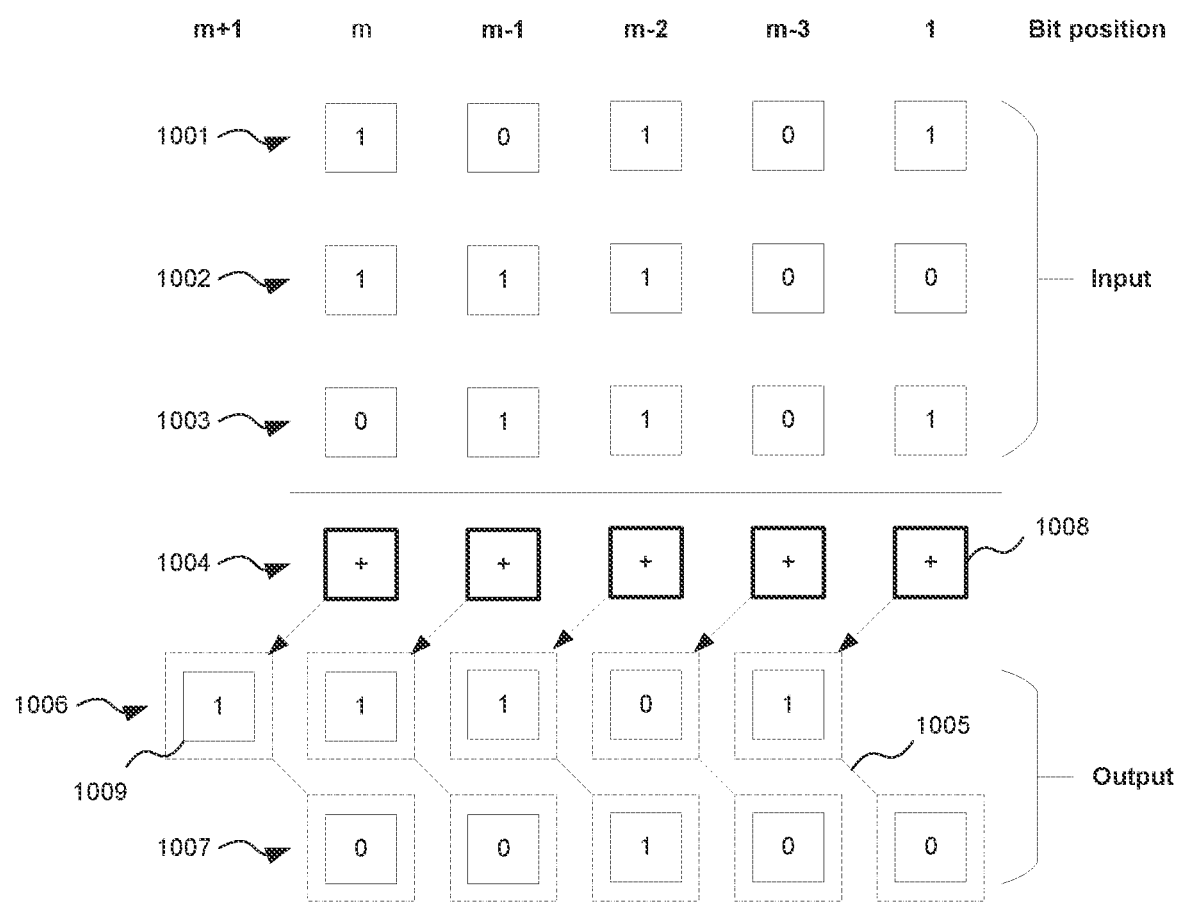
FIG. 10 schematically illustrates the operation of a reduction cell.

By operating a reduction cell comprising m full adders on the columns of a set of three rows of x' in the manner shown in FIG. 10, the number of rows of x' can be reduced by 1. It is however preferable for reduction logic 101 to comprise a plurality of reduction cells 302 operating in parallel on the rows of x'. Each operation of such a set of reduction cells would represent a reduction step which reduces the number of rows of x' by the number of reduction cells. Since the length in bits of x which the binary logic circuit is arranged to process is known at design time, it is advantageous for the reduction logic 101 to comprise as many reduction cells as there are sets of three rows of x' each of length m. In other words: a binary input x of length n would create $$\left\lfloor \frac{n}{m} \right\rfloor$$

rows of length m, plus potentially a row of length less than m. Empty bits in any rows of less than m can be set to 0.

For a binary input of length n, $$\left\lfloor \left\lceil \frac{n}{m} \right\rceil / 3 \right\rfloor$$

reduction cells may be provided so as to reduce the number of rows of x' by around a third.

$$\left\lceil \frac{n}{m} \right\rceil$$

represents the initial number of rows of x', which may include a row of length less than m. When n is an integer multiple of m, the number of reduction cells is $$\left\lfloor \frac{n}{3m} \right\rfloor.$$

As the number of rows of x' becomes smaller, the number of reduction cells also becomes smaller.

In order to reduce the number of rows of x' down to two, a set of reduction cells at the reduction logic may be configured to operate iteratively on x' until the number of rows of x' reaches two. For example, reduction logic comprising $$\lfloor \lceil \tfrac{n}{m} \rceil / 3 \rfloor$$

reduction cells may be configured to iteratively perform a series of reduction steps on the rows of x', with fewer and fewer reduction cells being required at each reduction step, until only two rows remain. This can be achieved through the use of sequential logic and a clock signal to schedule the outputs of the reduction cells for the previous reduction step into the inputs of the reduction cells for the next reduction step. However, such a configuration would typically allow only one reduction step (iteration) per clock cycle.

It is preferable that the reduction logic comprises multiple stages of reduction cells arranged in series with each stage of reduction cells receiving its input from the output of the previous stage. The reduction cells of each stage may be configured to operate in parallel. As many stages of reduction cells are provided as are required to reduce an input x down to a sum of binary values of length m in a single operation without iteration. This arrangement is shown for reduction logic 101 in FIG. 3. In this example, the reduction logic comprises a plurality of reduction stages of which three are shown: stages 301, 302 and 303. Each reduction stage comprises one or more reduction cells 304.

Each reduction cell 304 comprises a set of full adders as shown in FIG. 10 which are each configured to sum a set of three rows of x' so as to, at each reduction stage, form in their place a new pair of rows of x' and hence reduce the number of rows of x' by one. By operating reduction cells 304 in parallel it is possible to reduce the number of rows of x' by around a third at each reduction stage.

The first reduction stage 301 comprises $$\lfloor \lceil \tfrac{n}{m} \rceil / 3 \rfloor$$

reduction cells 304 each having m full adders arranged to operate in parallel on a set of three rows in the manner shown in FIG. 10. Each reduction cell reduces the 3 rows it operates on down to 2 rows. The number of rows provided at the output of the first reduction stage will therefore be:

$$\lceil \tfrac{n}{m} \rceil - \left\lfloor \frac{\lceil \tfrac{n}{m} \rceil}{3} \right\rfloor = \left\lceil \frac{2*\lceil \tfrac{n}{m} \rceil}{3} \right\rceil.$$

A second reduction stage (e.g. 302) is arranged to operate on the output of the first reduction stage and comprises a number of reduction cells appropriate to the number of rows provided at the output of the first reduction stage. For example, if the number of output rows from the first stage is b then the second reduction stage comprises $\lfloor b/3 \rfloor$ reduction cells 304. A sufficient number of further reduction stages are arranged in series in this manner until the output of a final reduction stage 303 includes only two rows. The final reduction stage 303 comprises a single reduction cell 304 which is configured to operate on the three output rows of the preceding reduction stage.

In this exemplary configuration, the total number of full adders present in the reduction logic will be $$m \left( \lceil \tfrac{n}{m} \rceil - 2 \right)$$

full adders. It will be appreciated that where a row has fewer than m bits, some of the inputs to the full adders will be zero. Such full adders could be considered to be half adders in which case there will be $$m \left( \lceil \tfrac{n}{m} \rceil - 2 \right) - (-n) \bmod m$$

full adders and $(-n) \bmod m$ half adders. The configuration described represents reduction logic having the minimum number of reduction stages.

Reduction logic configured in this manner with a series of reduction stages each comprising one or more reduction cells operating in parallel on the rows of x' would typically be able to perform the compression of x down to two rows of x' of length m in a single clock cycle of the digital platform on which the reduction logic is running. The use of serial reduction stages therefore offers a high speed configuration for reducing an input x to a sum of two rows $\beta+\gamma$ which satisfy:

$$x \bmod (2^m - 1) = (\beta + \gamma) \bmod (2^m - 1)$$

As an example, consider an input x of length n=48 for the case m=5. For the preferred case, the first stage of the reduction logic comprises $$\lfloor \lceil \tfrac{48}{5} \rceil / 3 \rfloor = \lfloor \tfrac{10}{3} \rfloor = 3$$

reduction cells for operation on the initial set of 10 rows of x', leaving a short row of 3 bits unallocated to a reduction cell. Each reduction cell operates in the manner illustrated in FIG. 10 with each reduction cell of the first reduction stage reducing its three input rows down to two. The output of the first reduction stage, e.g. 301, would therefore comprise 7 rows (including the unallocated short row which may be considered as forming part of the 'output' of the first stage). The second reduction stage, e.g. an intermediate stage 302, comprises two reduction cells which may be arranged to compress 6 of the 7 rows down to 4 rows, leaving 5 rows in total. Subsequent reduction stages (3 more would be required) may each comprise one reduction cell operating on three rows output by the previous stage until only two rows remain. This example represents one possible arrangement of reduction cells into a series of reduction stages at reduction logic 101.

It will be appreciated that full adders may be arranged in reduction cells in various other configurations. Because the number of rows available as inputs to a stage will be an integer multiple of 3, it is not always possible for a reduction stage to operate on all of the available rows. There are typically multiple ways of arranging the full adders within the reduction logic, whilst still achieving the same number of reduction stages. This freedom allows designers to, for example, optimise the reduction logic so as to minimise its area/delay/power when processed into a physical logic circuit.

Many other configurations of reduction logic are possible for compressing an input x down to two rows of length m. The reduction logic could comprise reduction cells other than full adders, such as ripple-carry adders which can be used reduce two rows down to one row. However, it is preferable not to use ripple carry adders configured to add pairs of rows in parallel implementations because the carry propagation of ripple carry adders results in relatively slow performance compared to other types of reduction cell.

Figure 4:
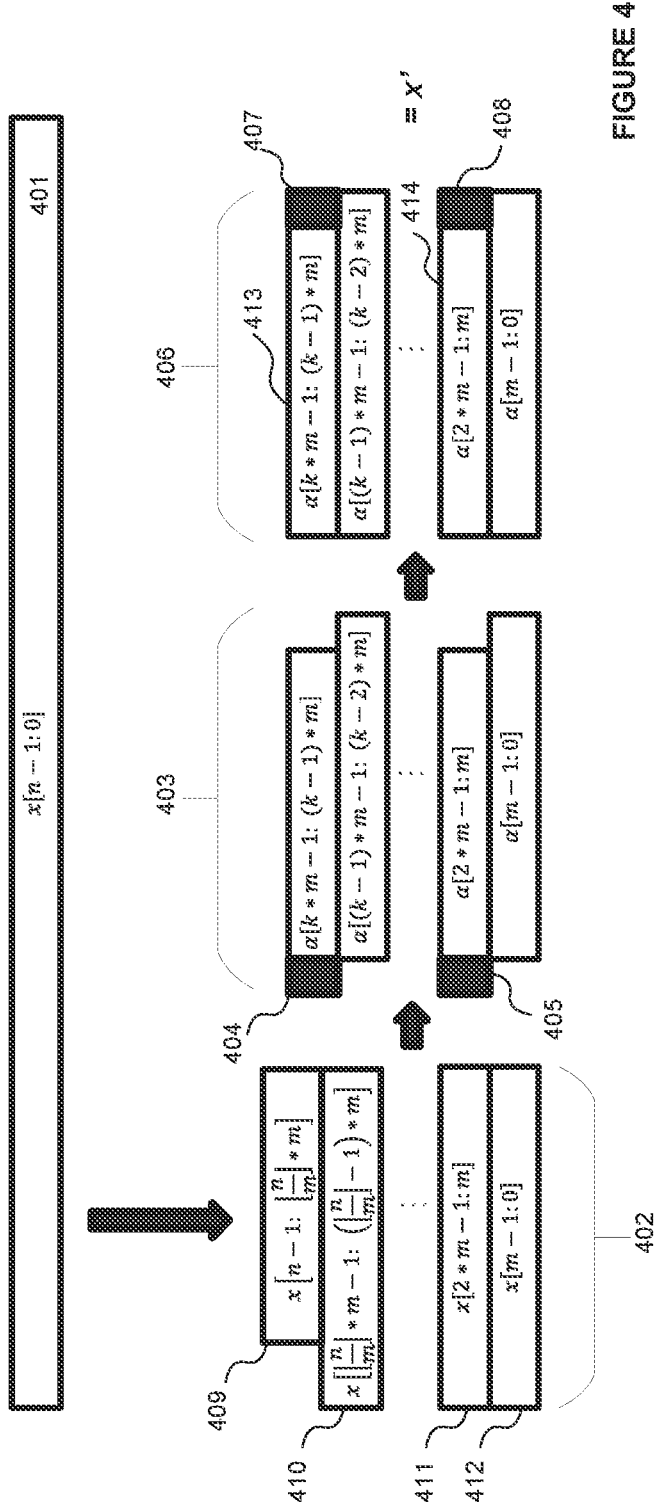
FIG. 4 illustrates the reduction of an input value x at the reduction logic.

FIG. 4 illustrates in more detail a first reduction step performed by reduction logic 101. The n bit positions of input x 401 are labeled in FIG. 4 as n−1 for the most significant bit down to 0 for the least significant bit. As has been shown, for the purposes of calculating y=x mod($2^m-1$), input x can be expressed as a sum 402 of rows of length m, where the rows represent consecutive m-bit portions of x. The number of rows will therefore depend on the length of x. Where n (the length of x) is not an integer multiple of m, there will be an insufficient number of bits to fill the final m-bit portion, indicated by 409 in FIG. 4. These bits may be set to 0 or interpreted as being 0 in the reduction logic.

The output of the first reduction step performed by the reduction logic on x' is illustrated at 406 in FIG. 4. The rows of sum 406 represent a new value a which has a mod($2^m-1$) value equal to that of x. The formation of the output rows 406 will now be explained with reference to rows 403 (which are shown for clarity but preferably do not represent an intermediate result formed at the reduction logic).

The reduction performed by the first reduction step generates carry bits 404 and 405. As described above, any carry bits generated at the $m^{th}$ bit position by a reduction step (e.g. 404, 405) are wrapped-around to the first, least significant bit position (e.g. 407, 408) as shown at 406 in FIG. 4. This is acceptable because $2^m$ mod($2^m-1$)=$2^0$. The wrapping-around of carry bits may be performed in any suitable manner—for example through suitable connections between reduction stages or through appropriate configuration of reduction logic configured to operate iteratively on x'. Because of the nature of the operations performed, the first bit position will always be empty for a row for which a carry bit is generated (e.g. row 1006 in FIG. 10).

In the example described above, each reduction step reduces the number of rows of x' by around a third. In other examples in which other types or arrangements of reduction cell are used, the number of rows may be differently reduced at each reduction step—for example, arrangements of reduction cells may be used which reduce 4 rows to 3, or 7 rows to 3. Such arrangements may generate more than one carry bit which is to be wrapped-around to empty least significant bit positions in accordance with the principles described above.

In the case that n mod m≠0, then in the initial expression of x' 402 there will always exist a row with a 0 bit for every possible input value of x. If a 0 is one of the three inputs to a full adder, then one of the two outputs must also be a 0, since only if each input is 1 is each output 1. Hence at least one bit of one of the rows of x' will be 0 after every reduction step performed by reduction logic 101. Since x' lies in the range [0, 2*($2^m-1$)], it follows that only in the case when n mod m=0 and x=$2^n-1$ (i.e. all n input bits are 1) does x' attain its maximum value of 2*($2^m-1$) in which all the bits in the rows of x' remain 1. This point is relevant to the discussion below in which optional exception logic 112 (used in the case that n mod m=0) is provided in order to reduce the critical path delay at addition logic 104.

It is to be noted that FIG. 4 is a schematic illustration of the logical operation of the reduction logic in the present example and is not intended to suggest that the bit values of x need to be physically stored in the reduction logic as a sum of rows 402. The reduction logic may operate on the bit values of x held in any form at the reduction logic or at any other part of the binary logic circuit.

The usefulness of expressing an n-bit input x as a sum x' of two m-bit numbers β and γ for the purpose of calculating y=x mod($2^m-1$) will now be demonstrated.

Figure 6:
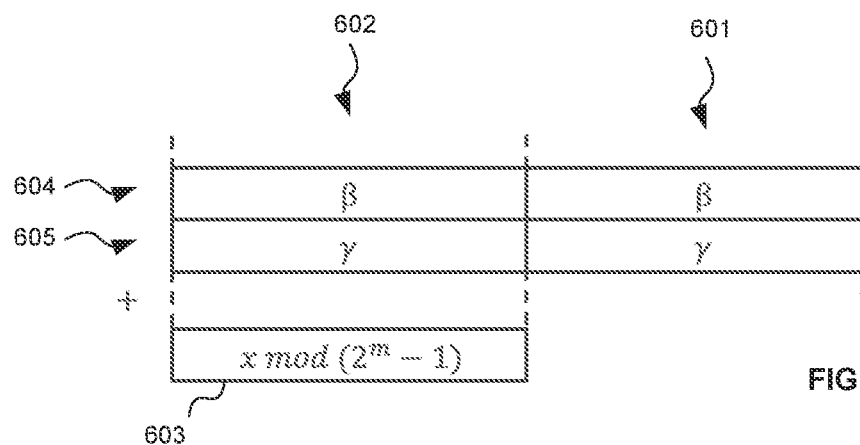
FIG. 6 is a schematic representation of addition logic performed at the binary logic circuit of FIG. 1.

A representation of a binary sum for calculating y=x mod($2^m-1$) is shown in FIG. 6. The sum in FIG. 6 may be performed at a binary multiplier array, such as a constant factor multiplication array (since n and m will be known at design time). The summation calculation shown represents a sum of:

a first row 604 comprising the bits of repeated twice (i.e. the bits of in column 601 and the bits of left-shifted by m bits in column 602);

a second row 605 comprising the bits of γ repeated twice (i.e. the bits of γ in column 601 and the bits of γ left-shifted by m bits in column 602); and

1.

The significance of this calculation will now be explained. Note that columns 601 and 602 are merely schematic and do not represent independent sums.

In the case that n mod m=0 and x=$2^n-1$ (all of the digits of x are 1), the value x'=β+γ=$2^{m+1}-2$. This case may be handled separately at exception logic in the manner described below. For all inputs of x when n mod m≠0, and for all inputs of x when n mod m=0 except the above noted case when x=$2^n-1$, the value x'=β+γ lies in the range [0, $2m+^1-3$]. Consider a first part of that range in which (β+γ)∈[0,$2^m-2$]. It follows from this possible range of values of β+γ that:

$$\beta+\gamma=((\beta+\gamma)\mod(2^m-1))=(x \mod(2^m-1))$$

In other words, y is in this case equivalent to the sum β+γ. This is because the sum β+γ+1 in column 601 does not generate a carry bit since 0≤β+γ+1<$2^m$. The output 603 of the binary sum shown in FIG. 6 is in this case the same as the sum shown in column 602.

Now consider a second part of the range of x' in which (β+γ)∈[$2^m-1,2^{m+1}-3$]. In this case the sum β+γ+1 in column 601 does generate a carry bit in the (m+1)th column because $2^m$≤β+γ+1<2*$2^m$. It follows that:

$$2^m-1 \le \beta+\gamma < 2*(2^m-1)$$

and so:

$$((\beta + \gamma + 1)\mod 2^m) =$$
$$(\beta + \gamma + 1) - 2^m = (\beta + \gamma) - (2^m - 1) = ((\beta + \gamma)\mod(2^m - 1))$$

For the complete range (β+γ)∈[0,$2^{m+1}-3$] we have that:

$$(\beta+\gamma)\mod(2^m-1)=(\beta+\gamma+1)\mod 2^m \text{ if } \beta+\gamma+1\ge 2^m$$

and otherwise:

$$(\beta+\gamma)\mod(2^m-1)=(\beta+\gamma)\mod 2^m$$

It will be appreciated from the above that the sum shown in FIG. 6 can provide the required output y=x mod($2^m-1$) through appropriate selection of the bits of the result 603 of the sum. For example, if β+γ+1 doesn't produce a carry bit, then the output 603 is given by the first m bits of the sum β+γ in column 602. This value is equal to (β+γ)mod $2^m$. If β+γ+1 does produce a carry bit, then the output 603 is given by the first m bits of the sum β+γ+1 in column 602, where the additional 1 is caused by the carry up from the sum formed in column 601. This value is equal to ((β+γ+1)mod $2^m$).

In other words, the output y=x mod($2^m$−1) is given by the bit selection 603 equivalent to taking m bits of the result of the sum shown in FIG. 6 following a right-shift by m, i.e. the m bits at positions m+1 through 2m of the sum.

The sum and bit selection shown in FIG. 6 may be implemented in any suitable manner at a binary logic circuit, e.g. at addition logic 104 shown in FIG. 1. The output of the binary logic circuit would be the target value y. In some implementations, the binary logic circuit may not be configured to calculate the full sum shown in FIG. 6; a binary logic circuit could be configured to generate only the required bits 603 representing the output y in any suitable manner.

In the exemplary binary logic circuit shown in FIG. 1, the addition logic comprises an adder 105 which is an array configured to perform the sum of FIG. 6. The adder receives x' from the reduction logic 101 expressed as a sum of two m-bit values β and γ. The output 108 of the addition logic is the selection of the m bits at positions m+1 through 2m of the sum evaluated by the adder. This bit selection may be achieved in a physical logic circuit by hardwiring output bits from the sum formed by the adder to the output of the addition logic so as to generate the output y.

The adder 105 in FIG. 1 is of width 2*m. Because of the nature of the sum performed by the adder (see FIG. 6), there is a significant amount of repetition in the additions performed. It can be advantageous to, in place of adder 105, use a compound adder configured to calculate both β+γ and β+γ+1 at the same time. This example is illustrated by binary circuit 200 in FIG. 2 in which compound adder 205 receives both β and γ from reduction logic 101 and calculates both β+γ (signal 208) and β+γ+1 (signal 209). Referring back to FIG. 6, the compound adder 205 may be considered to concurrently calculate the sum of column 601 (β+γ+1) and the sum of column 602 (β+γ). A multiplexer 206 is used to select between the signals 208 and 209 based on a carry bit 207 generated by the sum β+γ+1. If the carry bit is 1, the output 108 of the addition logic is (β+γ+1)mod $2^m$; if the carry bit is 0, the output 108 of the addition logic is β+γ. The use of a compound adder can help to minimise circuit area of the binary logic circuit.

In the case when n mod m=0 and x=$2^n$−1, β+γ=$2^{m+1}$−2, which lies outside the range [0,$2^{m+1}$−3]. In this case a multiplier array configured to calculate the sum shown in FIG. 6 does not provide the correct output. The output of logic implementing the sum shown in FIG. 6 when β,γ=$2^m$−1 is $2^m$−1, whilst the answer is in fact 0. It is advantageous to handle this exception outside of the addition array so as to not compromise the choice of array. For example, an array optimised for size/speed/power consumption can be selected as appropriate to the particular implementation, without the array needing to be modified to handle the exception case.

Figure 2:
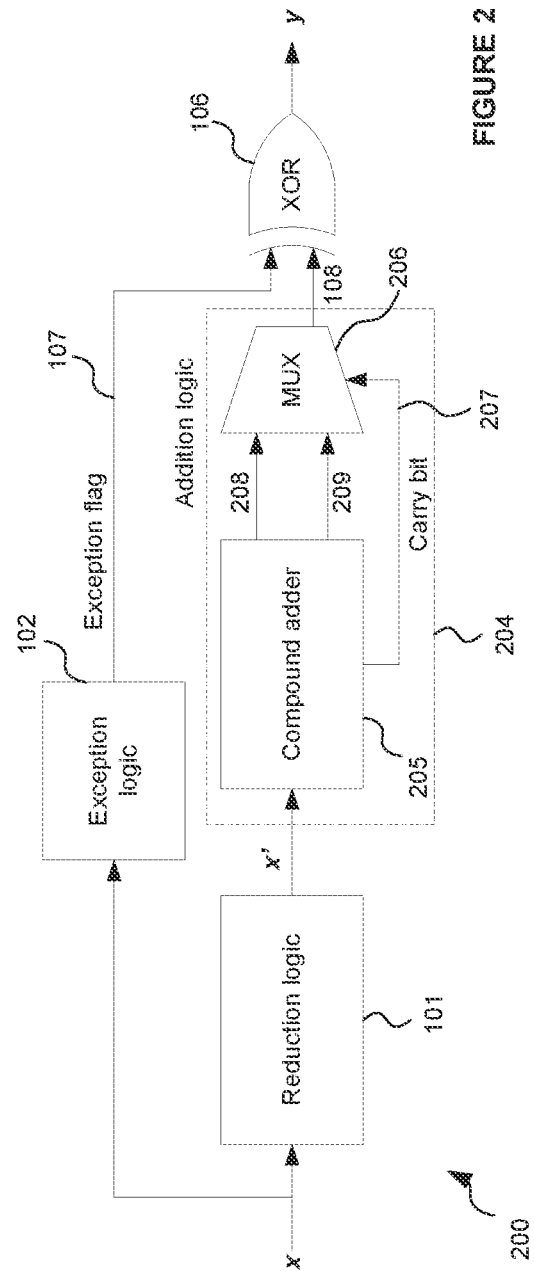
FIG. 2 is a schematic diagram of a binary logic circuit according to a second example.

For example, returning to the exemplary binary logic circuits shown in FIGS. 1 and 2, when n mod(m)=0 the exception in which all of the input bits of x are 1 may be handled at exception logic 102. The values of n and m will be known at design time.

The exception logic is not required if n mod(m)≠0. The exception logic may be configured in any suitable manner but it is advantageous if the output of the exception logic 107 is a binary indication (e.g. an exception flag) of 1 if all of the input bits of x are 1, and 0 if not all of the input bits of x are 1. This allows fast and efficient XOR logic 106 to be used to generate output y. The XOR logic could be included in addition logic 104/204. XOR logic 106 receives as its inputs the exception flag 107 from the exception logic 102 and the output 108 of addition logic 104/204. The output of the XOR logic is y for the exception case because $2^m$−1 (the output of the addition logic in this case) is the logical inverse of 0 (treating 0 as an m-bit binary string), so a XOR has the required effect.

Figure 7:
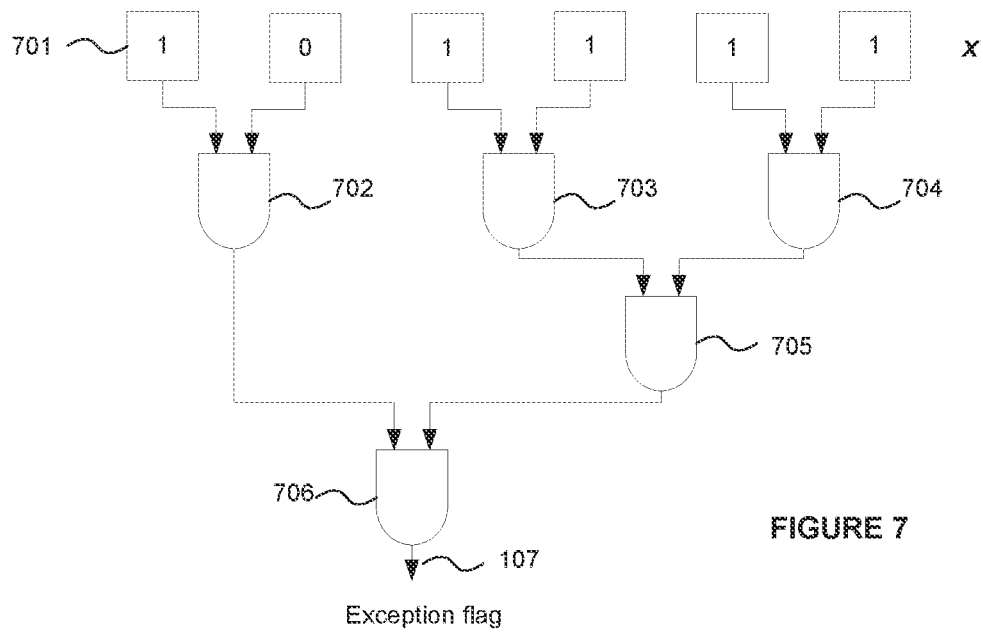
FIG. 7 shows an example of an AND tree for use at exception logic of the binary logic circuits of FIGS. 1 and 2.

An example configuration of the exception logic 102 for use in the case when n mod(m)=0 is shown in FIG. 7. The bits of an exemplary input x are schematically represented by bit values 701 in the figure. A tree of AND gates 702 is configured to receive the bits of x and provide a single output bit for use as exception flag 107. The tree of AND gates could be arranged in many different ways to achieve the same result. One arrangement suitable for operating on a 6-bit input x is shown in FIG. 7. The AND tree is comprised of three AND gates 702-704 which each receive two bit values 701 as inputs, an AND gate 705 which receives as its inputs the outputs of AND gates 703 and 704, and an AND gate 706 which receives as its inputs the outputs of AND gates 702 and 705. The AND tree is arranged such that every bit value 701 provides an input to an AND gate. It will be appreciated that the output 107 of the AND tree will only be 1 in the event that all of the bit values 701 are 1. The AND tree in FIG. 7 may operate on inputs which are less than 6 bits in length by setting to 1 any bit values 701 which are unused by the input number.

Figure 8:
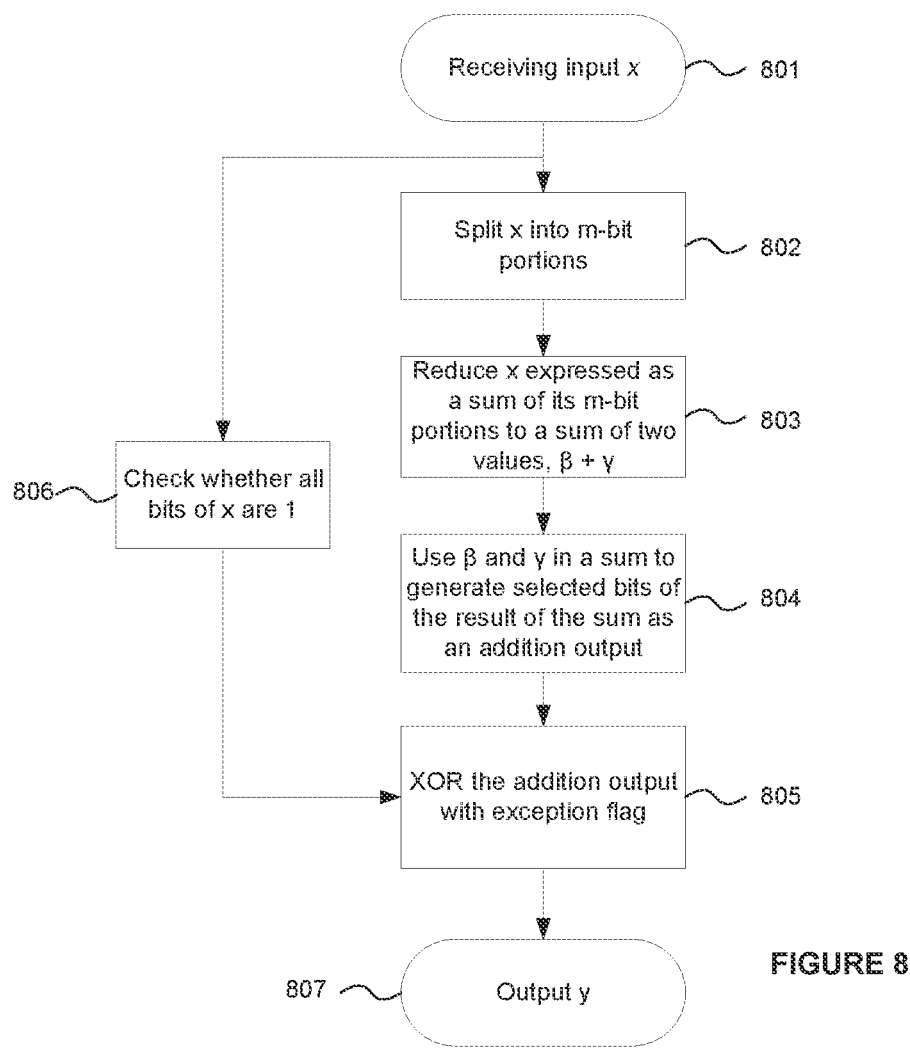
FIG. 8 is a flowchart showing the general operation of binary logic circuits configured in accordance with the principles described herein.

FIG. 8 is a flowchart illustrated the general operation of binary logic circuits configured according to the principles described herein, such as the binary logic circuits shown in FIGS. 1 and 2. At 801, the binary logic circuit receives an input x for which the value of x mod($2^m$−1) is to be calculated. At 802, the input is split into consecutive m-bit portions which, expressed as a sum, represent x'. Note that logic performing step 802 need not physically arrange the bits of x in this manner; this step could be satisfied by logically treating the bits of x as x'. The input is also checked at 806 whether all of its bits are 1; if so, an exception flag having the value 1 is generated. At 803, the sum x' is reduced to a sum of two m-bit values, β+γ. At 804, the values of β and γ are used in the sum described above in relation to FIG. 6a so as to generate selected bits of the result of that sum which represent an addition output ($2^m$+1)*x'+1 (the complete sum itself may or may not be evaluated). At 805, the addition output and exception flag are provided as inputs to a XOR. The output of the XOR 807 is the value y=x mod($2^m$−1).

Figure 5:
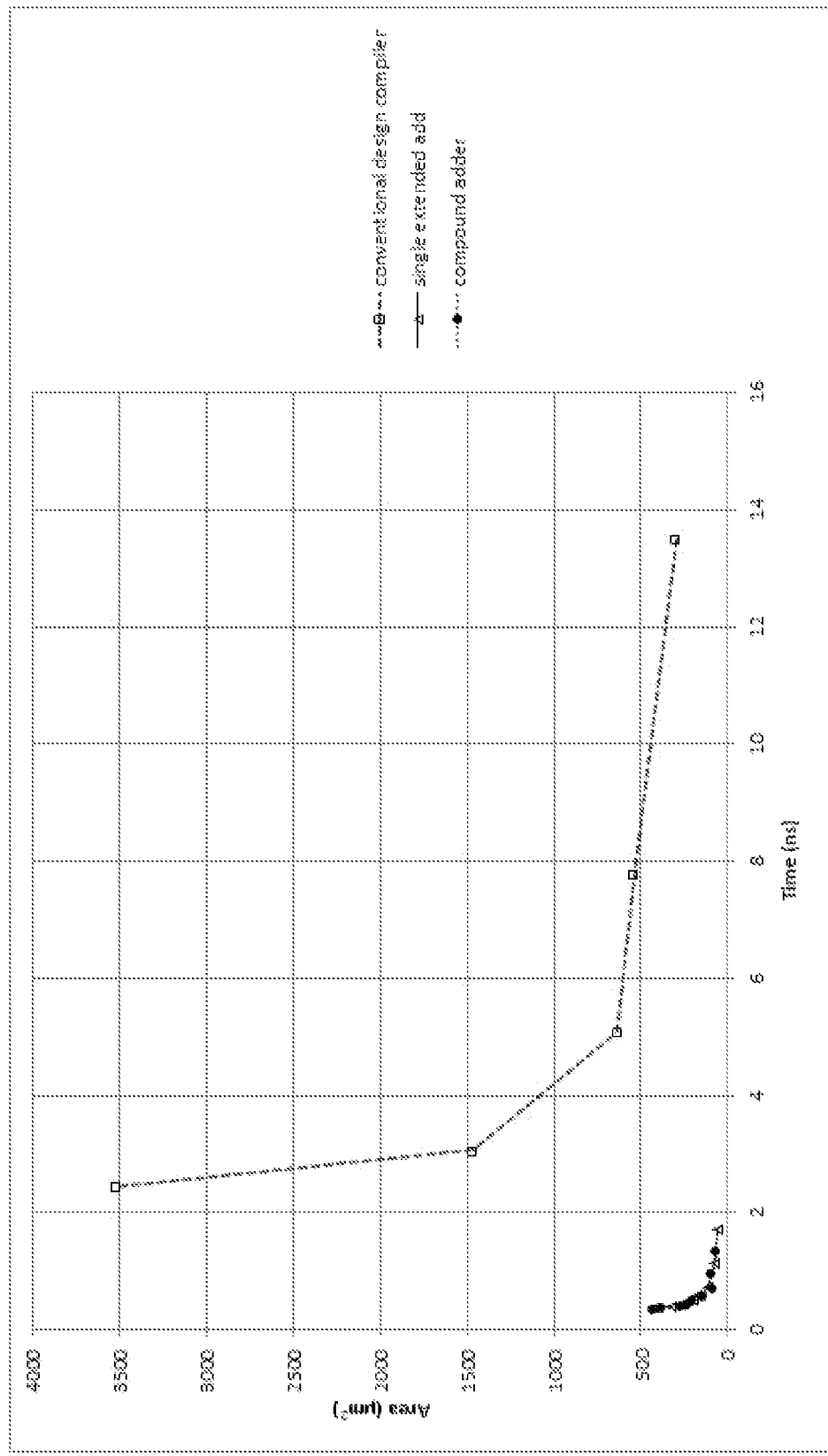
FIG. 5 shows a plot of area versus delay for three different binary logic circuits.

FIG. 5 illustrates the savings in circuit area achieved through the use of a binary logic circuit according to the examples described herein, compared to conventional binary logic circuits for calculating y=x mod($2^m$−1). FIG. 5 is a plot of area versus delay for three different binary logic circuits each configured for calculating modulo $2^8$−1 of a 31 bit input. The top curve with square data points is a plot of area versus delay of a binary logic circuit for calculating y=x mod($2^m$−1) as generated by a conventional tool for generating RTL. The curves with triangular and circular data points are plots for binary logic circuits as shown in FIGS. 1 and 2 respectively. It can be seen from FIG. 5 that both of the exemplary binary logic circuit designs exhibit significant savings in circuit area and lower delay on the critical path.

Figure 9:
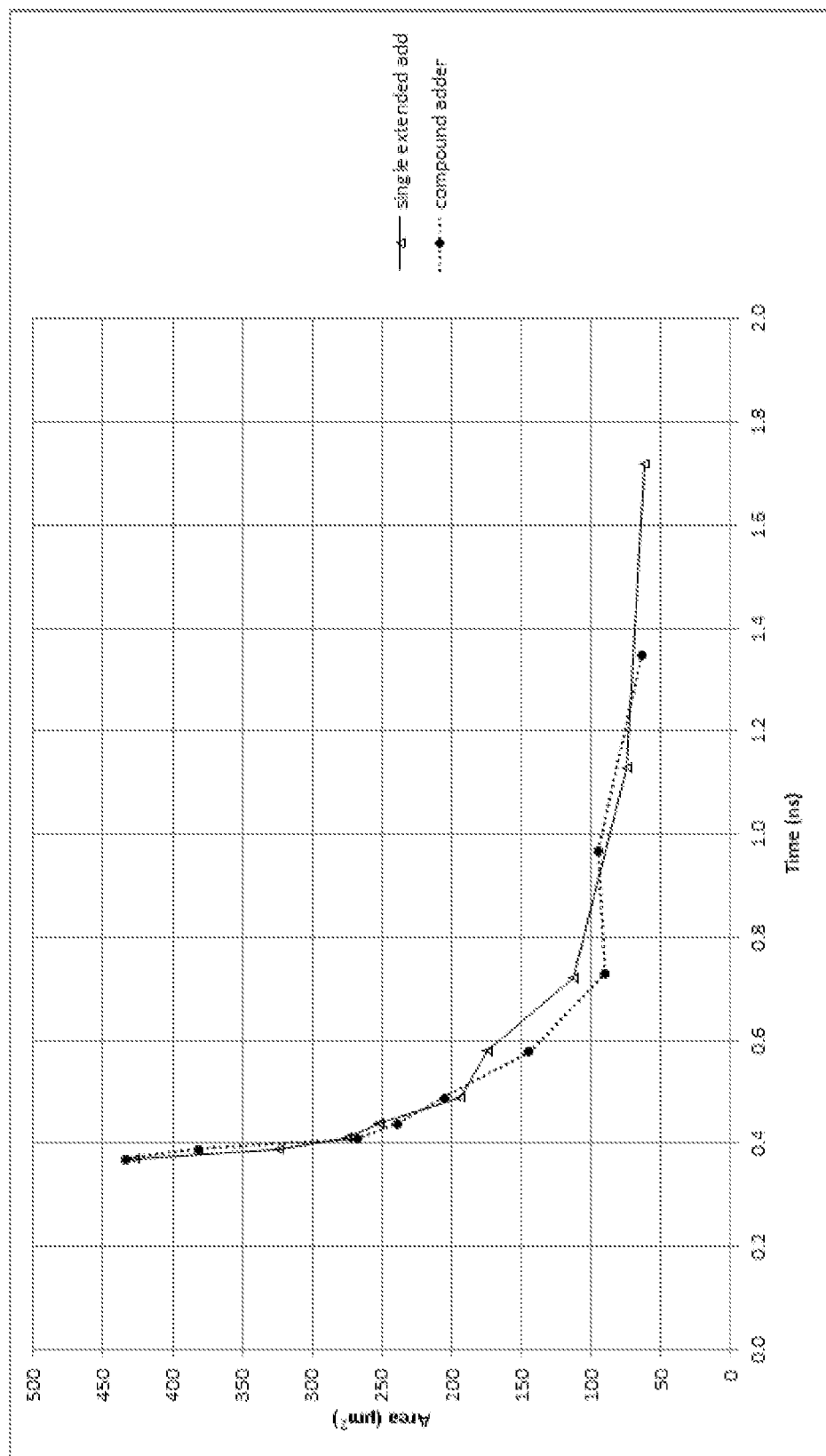
FIG. 9 shows a plot of area versus delay for the binary logic circuits shown in FIGS. 1 and 2.

The lower curves of FIG. 5 which represent plots of area versus delay for the two exemplary binary logic circuits of FIGS. 1 and 2 are shown in more detail in FIG. 9. It can be seen that at low delays the compound adder implementation of FIG. 2 provides a binary logic circuit of lower area.

Optimal solutions for calculating y=x mod($2^m-1$) in binary logic are described herein. Typically, integrated circuits are initially designed using software (e.g. Synopsys® Design Compiler) that generates a logical abstraction of the desired integrated circuit. Such an abstraction is generally termed register-transfer level or RTL. Once the logical operation of the integrated circuit has been defined, this can be used by synthesis software (e.g. Synopsys® IC Compiler) to create representations of the physical integrated circuit. Such representations can be defined in high level hardware description languages, for example Verilog or VHDL and, ultimately, according to a gate-level description of the integrated circuit.

Where logic for calculating y=x mod($2^m-1$) is required, design software may be configured to use logic configured according to the principles described herein. This could be, for example, by introducing into the integrated circuit design register transfer level (RTL) code defining a logic circuit according to the examples shown in FIG. 1 or 2.

It will be appreciated that in order to represent an input binary integer x as a sum of rows of m-bit binary integers x' it is not necessary to physically re-order the bits of the input binary integer. Binary logic circuits configured to operate on the rows of x' may logically interpret the bits of x as being represented as a sum of rows of m-bit binary integers x' and process them as such without any physical reconfiguration of x (e.g. actually splitting up x into m-bit rows in hardware is not required). This is generally true for the input and output values of the elements of binary logic circuits described herein: any binary values may be physically manifest in any form; the teaching herein shall be understood to explain the logical operation of binary logic circuits and is not intended to limit the possible physical representations of binary values in which binary values are stored, cached or otherwise represented (e.g at registers or memory of a binary circuit).

Figure 3:
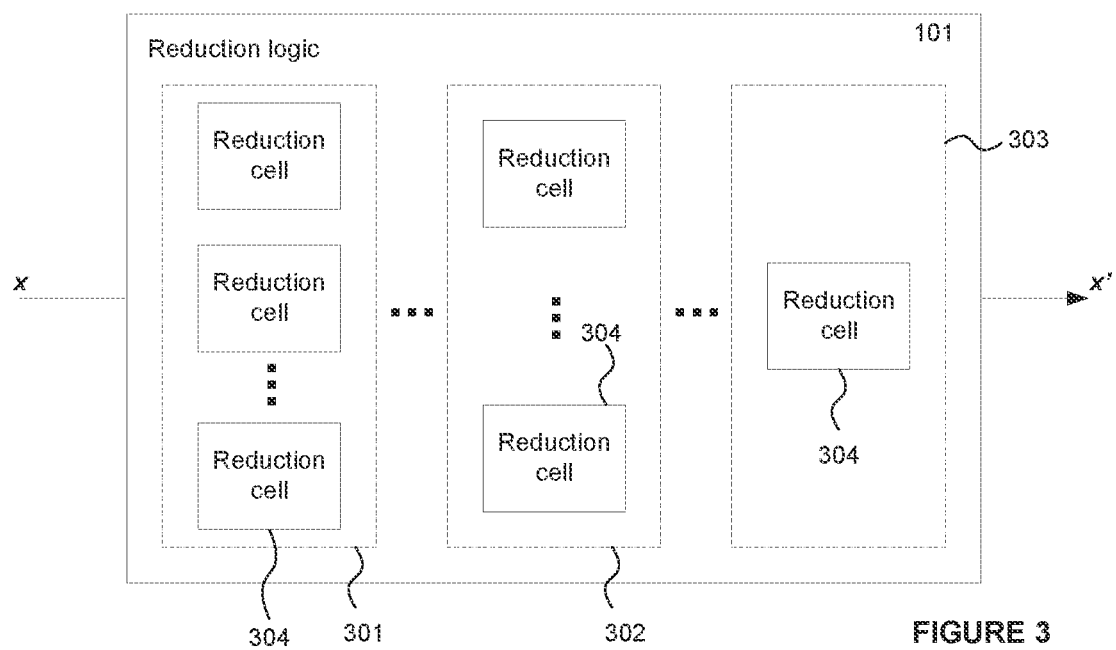
FIG. 3 is a schematic diagram of reduction logic for use at a binary logic circuit.

The binary logic circuits of FIGS. 1 and 2 and the reduction logic of FIG. 3 are shown as comprising a number of functional blocks. This is schematic only and is not intended to define a strict division between different logic elements of a binary logic circuit or reduction logic. Each functional block may be provided in any suitable manner.

The terms software, program code and computer-readable code encompass executable code for processors (e.g. CPUs and/or GPUs), firmware, bytecode, programming language code such as C or OpenCL, and modules for reconfigurable logic devices such as FPGAs. Program code further includes code defining representations of integrated circuits at any level, including at register transfer level (RTL), at high-level circuit representations such as Verilog or VHDL, and lower-level representations such as OASIS and GDSII. When executed at a computer system configured for generating a representation of an integrated circuit in hardware, such code defining representations of integrated circuits may cause such a computer system to generate the integrated circuit as defined in the code. The code may include definitions of circuit elements and/or rules for combining circuit elements. Some or all of the rules for combining the defined circuit elements may be provided at the computer system as default rules for generating a representation of an integrated circuit in hardware from such program code.

The algorithms and methods described herein could be performed by one or more physical processing units executing software that causes the unit(s) to perform the algorithms/methods. The or each physical processing unit could be any suitable processor, such as a CPU or GPU (or a core thereof), or fixed function or programmable hardware. Machine-readable code could be stored in non-transitory form at a machine readable medium such as an integrated circuit memory, or optical or magnetic storage. A machine readable medium might comprise several memories, such as on-chip memories, computer working memories, and non-volatile storage devices.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A circuit configured to determine y=x mod($2^m-1$), where x is an n-bit binary number, y is an m-bit binary number, and n>m, the circuit comprising:
   addition logic, embodied in fixed function hardware configured to:
      receive a first m-bit binary number $\beta$ and a second m-bit binary number $\gamma$; and
      calculate y based on a summation comprising:
         a first binary value of length 2m, comprising the bit values of $\beta$; and
         a second binary value of length 2m, comprising the bit values of $\gamma$;
   wherein the addition logic comprises a compound adder configured to concurrently form a first sum $\beta+\gamma$ and a second sum $\beta+\gamma+1$, and wherein the compound adder is configured to provide the first sum $\beta+\gamma$ and the second sum $\beta+\gamma+1$ to a multiplexer configured to select between the first and second sums in dependence on whether the second sum generates a carry bit.

2. The circuit as claimed in claim 1, wherein the first binary value of length 2m comprises the bit values of $\beta$ repeated twice and the second binary value of length 2m comprises the bit values of $\gamma$ repeated twice.

3. The circuit as claimed in claim 1, wherein the first binary value of length 2m comprises a string of bit values represented by $\beta$ and the second binary value of length 2m comprises a string of bit values represented by $\gamma$.

4. The circuit as claimed in claim 1, wherein the circuit further comprises reduction logic, and wherein the addition logic is configured to receive the first m-bit binary number $\beta$ and the second m-bit binary number $\gamma$ from the reduction logic.

5. The circuit as claimed in claim 4, wherein the reduction logic is configured to interpret x as a sum of m-bit rows x', each row representing m consecutive bits of x such that each bit of x contributes to only one row and all of the bits of x are allocated to a row, and the reduction logic is configured to reduce the sum of such m-bit rows x' in a series of reduction steps so as to generate a sum of the first m-bit binary number β and the second m-bit binary number γ.

6. The circuit as claimed in claim 5, wherein each reduction step comprises summing a plurality of the m-bit rows of x' so as to generate a sum of one or more fewer m-bit rows.

7. The circuit as claimed in claim 5, wherein the reduction logic comprises one or more reduction cells each configured to sum a plurality of the m-bit rows of x' so as to generate a sum of one or more fewer m-bit rows.

8. The circuit as claimed in claim 7, wherein the reduction logic comprises a plurality of reduction cells and the plurality of reduction cells are configured to operate in parallel on the rows of x' at each reduction step.

9. The circuit as claimed in claim 7, wherein the reduction logic is further configured to iteratively operate the one or more reduction cells over the rows of x' until two rows remain which represent m-bit binary numbers β and γ.

10. The circuit as claimed in claim 1, further comprising:
exception logic configured to form a determination result indicating whether all of the bits of x are 1; and
output logic configured to operate on the addition output in dependence on the determination result received from the exception logic;
wherein the output logic is configured to, if the determination result indicates that all of the bits of x are 1, perform a XOR operation of the addition output with the binary value 1.

11. The circuit as claimed in claim 10, wherein the exception logic is further configured to form a determination result of 1 if all of the bits of x are 1 and a determination result of 0 if not all of the bits of x are 1, and the output logic comprising a XOR gate configured to receive the addition output and determination result as its inputs so as to form as its output y for all inputs x.

12. The circuit as claimed in claim 10, wherein the exception logic comprises a hierarchy of AND gates, the output of the final AND gate being the determination result.

13. The circuit as claimed in claim 1, wherein the addition output of the multiplexer is the second sum if a carry bit is generated and the first sum if a carry bit is not generated.

14. The circuit as claimed in claim 1, wherein the addition logic comprises an adder configured to calculate a sum of the first and second binary values and the binary value 1.

15. The circuit as claimed in claim 1, wherein and the addition logic is further configured to provide the m least significant bits of the sum right-shifted by m as the addition output.

16. The circuit as claimed in claim 4, wherein the reduction logic is embodied in fixed function hardware.

17. A method of determining $y = x \bmod(2^m - 1)$, where x is an n-bit binary number, y is an m-bit binary number, and n>m, the method comprising:
receiving, at addition logic embodied in fixed function hardware, a first m-bit binary number β and a second m-bit binary number γ; and
using the addition logic, at least partially calculating y based on a summation comprising:
a first binary value of length 2m, comprising the bit values of β; and
a second binary value of length 2m, comprising the bit values of γ;
wherein the addition logic comprises a compound adder configured to concurrently form a first sum β+γ and a second sum β+γ+1, and wherein the compound adder is configured to provide the first sum β+γ and the second sum β+γ+1 to a multiplexer configured to select between the first and second sums in dependence on whether the second sum generates a carry bit.

18. A non-transitory computer readable storage medium having stored thereon computer readable instructions that, when processed at a computer system for generating a manifestation of an integrated circuit, cause the computer system to generate a manifestation of a circuit configured to determine $y = x \bmod(2^m - 1)$, where x is an n-bit binary number, y is an m-bit binary number, and n>m, the circuit comprising:
addition logic, embodied in fixed function hardware configured to:
receive a first m-bit binary number β and a second m-bit binary number γ; and
calculate y based on a summation comprising:
a first binary value of length 2m, comprising the bit values of β; and
a second binary value of length 2m, comprising the bit values of γ;
wherein the addition logic comprises a compound adder configured to concurrently form a first sum β+γ and a second sum β+γ+1, and wherein the compound adder is configured to provide the first sum β+γ and the second sum β+γ+1 to a multiplexer configured to select between the first and second sums in dependence on whether the second sum generates a carry bit.

* * * * *